United States Patent
Chou et al.

[19]

[11] Patent Number: 5,961,859
[45] Date of Patent: Oct. 5, 1999

[54] METHOD AND APPARATUS FOR MONITORING LASER WELD QUALITY VIA PLASMA SIZE MEASUREMENTS

[75] Inventors: Mau-Song Chou, Rancho Palos Verdes; Christopher C. Shih, Torrance, both of Calif.; Bryan W. Shirk, Mesa, Ariz.

[73] Assignee: TRW Inc., Redondo Beach, Calif.

[21] Appl. No.: 08/956,881

[22] Filed: Oct. 23, 1997

[51] Int. Cl.$^6$ .................................................. B23K 26/02
[52] U.S. Cl. ............................... 219/121.63; 219/121.64; 219/121.83
[58] Field of Search .......................... 219/121.62, 121.63, 219/121.64, 121.83; 364/474.08

[56] References Cited

U.S. PATENT DOCUMENTS

| | | |
|---|---|---|
| 4,687,539 | 8/1987 | Burns et al. . |
| 4,764,655 | 8/1988 | Ortiz, Jr. et al. .................. 219/121.83 |
| 4,998,005 | 3/1991 | Rathi et al. . |
| 5,045,669 | 9/1991 | Ortiz, Jr. et al . |
| 5,059,761 | 10/1991 | Koegl et al. . |
| 5,155,329 | 10/1992 | Terada et al. . |
| 5,247,155 | 9/1993 | Steen et al. . |
| 5,256,852 | 10/1993 | Boudot . |
| 5,272,312 | 12/1993 | Jurca . |
| 5,283,416 | 2/1994 | Shirk . |
| 5,286,947 | 2/1994 | Clyde et al. . |
| 5,304,774 | 4/1994 | Durheim . |
| 5,329,091 | 7/1994 | Bissinger . |
| 5,360,960 | 11/1994 | Shirk . |
| 5,446,257 | 8/1995 | Sakamoto et al. . |
| 5,463,202 | 10/1995 | Kurosawa et al. .................. 219/121.83 |
| 5,486,677 | 1/1996 | Maischner et al. . |
| 5,506,386 | 4/1996 | Gross . |
| 5,607,605 | 3/1997 | Musasa et al. ...................... 219/121.64 |

FOREIGN PATENT DOCUMENTS

| | | |
|---|---|---|
| 4039303A1 | 12/1990 | Germany . |
| 4313287A1 | 4/1993 | Germany . |
| 5-77074 | 3/1993 | Japan . |
| 7-185855 | 7/1995 | Japan . |
| 7-195998 | 8/1995 | Japan . |
| WO9303881 | 8/1992 | WIPO . |
| 96/09912 | 4/1996 | WIPO . |

*Primary Examiner*—Gregory Mills
*Attorney, Agent, or Firm*—Michael S. Yatsko

[57] ABSTRACT

A method and apparatus for monitoring the quality of a laser process such as a welding process comprises monitoring the light emitted from the weld plasma above the surface of the workpiece being irradiated by the laser beam. The size of the plasma is determined from the light emission and compared to a predetermined value of the size as determined under process and workpiece conditions that produce welds of acceptable quality. Variations of the monitored plasma size greater than a preselected value can represent unacceptable welds. Such variations can be caused by changes in the laser beam power, the workpiece speed, laser focusing problems, insufficient shield gas flow, workpiece deformation and weld contamination. The process monitors the light emission from a selected range of wavelengths that correspond to the major emission peaks of the light spectrum. The process enables in-process control.

30 Claims, 9 Drawing Sheets

METHOD AND APPARATUS FOR MONITORING LASER WELD QUALITY VIA PLASMA SIZE MEASUREMENTS

BACKGROUND

The present invention is directed to the field of materials processing using lasers and, more particularly, to a method and apparatus for monitoring laser weld quality via plasma size measurements.

High power lasers are commonly used for materials working processes such as laser welding, cutting, drilling and heat treating. These processes provide a number of important advantages over conventional welding processes including enhanced speed, consistency and weld quality.

During laser materials working processes, the laser beam impinges on a workpiece, which becomes heated and eventually melts and then vaporizes. This vapor and the surrounding gases are ionized by the extreme heat and form a plasma plume between the laser and the workpiece. Weld quality is affected by the instability of the plasma formation and by instabilities in process operating conditions such as fluctuations in the laser power and shield gas flow, and by workpiece defects such as weld zone contamination and physical deformation.

As the use of laser materials working processes increases in industry, the need for accurate in-process techniques for monitoring process quality increases as well. In-process techniques provide important advantages as compared to post-process non-destructive quality control techniques such as x-ray and ultrasonic analysis, and visual inspection; and destructive quality control techniques such as metallography. Such post-process techniques tend to be labor intensive and tedious, and do not enable real time monitoring and control of the laser processing.

U.S. Pat. No. 5,360,960 discloses a laser process monitoring system by counting the number of violations each time the plasma light intensity violates one of the predetermined plurality of light limits. Known in-process techniques for monitoring laser materials working processes are not fully satisfactory. Particularly, known techniques can falsely reject good parts (type I error) or not reject bad parts (type II error). Type I errors are detrimental in terms of economic cost. Type II errors can be especially important, for example, in laser welded parts that require high weld quality at certain critical welds. The failure to detect bad welds can result in potentially dangerous parts being placed into components.

Thus, there is a need for a method and apparatus for monitoring laser materials working processes that can be used (i) in-process; (ii) to distinguish between good and bad welds and, thus, reduce the rate of type I and type II errors; and (iii) in various laser-material processes.

SUMMARY

The present invention provides a method and apparatus for monitoring laser materials working processing that satisfies the above needs. Particularly, the present invention is (i) used in-process; (ii) accurately distinguishes between good and bad welds and, thus, reduces the rate of type I and type II errors; and (iii) can be used to monitor various laser materials working processes.

The method according to the present invention comprises monitoring a laser welding process in which a laser beam impinges onto an object and a plasma is produced surrounding the object. The object is typically a workpiece and the laser beam impinges onto a surface of the workpiece. The method comprises the steps of monitoring, at a position above the surface and preferably as a function of time during the laser welding process, the spatial distribution of the intensity of light emitted from the plasma; assigning a numerical value representative of at least one physical dimension of the plasma to the monitored intensity of light; and comparing the numerical value of the physical dimension to a predetermined value of the physical dimension determined under laser welding conditions representative of acceptable quality welds. These conditions include "nominal" laser power and workpiece speed, sufficient shield gas flow about the plasma, sufficient cleanliness at the weld joint, satisfactory physical condition of the workpiece, absence of undesirable trace contaminants in the workpiece material, and proper focusing of the laser beam onto the workpiece. Depending on the variance of the numerical value of the physical dimension and the predetermined value, it can be determined whether the weld is of acceptable quality. The method allows in-process monitoring of the overall quality of the welding process.

The numerical value of the physical dimension is preferably a time-averaged value and can be the plasma height or the plasma width. The time-averaged value can be calculated for only a selected portion of the laser welding process, or for the entire duration of the laser welding process. The time-averaged value is preferably calculated for the steady state portion of the welding process during which the plasma is most stable.

The step of monitoring comprises passing the emitted light through a light filter having a light transmission band which covers the major emission lines of the emitted light. For example, for stainless steel workpieces, the light filter is preferably a blue-violet type filter. The light filter is positioned such that its optical axis is oriented at a small angle relative to the surface of the object and positioned close to the surface. The angle is typically less than about 5° relative to the surface, and the monitoring position is typically less than about 0.5 mm above the surface. An angle of about 0° gives excellent results.

The emitted light can be passed through additional optics including filters such as a neutral density filter and focusing lenses. The filtered light can be recorded as a plasma spatial profile on video frames by a video camera optically coupled to the light filter. The video frames are digitized to determine the plasma width and the plasma height. Optionally, the plasma physical dimensions can be determined using a linear array detector coupled to the light filter.

The time-averaged value of the physical dimensions of the plasma can be correlated with various operating and workpiece conditions to monitor the quality of the weld process. Particularly, the time-averaged value can be correlated with (i) the speed of movement of the object relative to the laser beam and the power of the laser beam; (ii) proper focusing of the laser beam onto the surface of the object; (iii) the flow of a shield gas about the plasma; (iv) weld defects such as inadequate depth of penetration; and (v) physical deformation of the object.

The present invention can also be used to monitor laser welding processes for localized weld problems. The method according to this aspect of the present invention comprises assigning a numerical value representative of at least one physical dimension of the plasma to the monitored intensity of light; and evaluating the numerical value of the plasma dimension for changes representing sudden, significant changes in the numerical value as a function of time. These sudden changes are referred to herein as "dips."

The step of evaluating can comprise producing a graph (temporal trace) of the physical dimension of the plasma as a function of time during the laser welding process.

The dips can be correlated with localized weld problems such as (i) the presence of contamination at the weld zone; (ii) the insufficient flow of a shield gas about the plasma; and (iii) physical deformation of the object.

The apparatus according to the present invention comprises means for monitoring, at a position above the surface of the object and preferably as a function of time during the laser welding process, the intensity of light emitted from the plasma; means for determining from the monitored intensity of light, preferably as a function of time during the laser welding process, a numerical value representative of at least one physical dimension of the plasma; and means for calculating a time-averaged value of the physical dimension from the numerical value determined for at least a portion of the laser welding process.

The monitoring means comprises light filtering means having a light transmission band covering the major emission lines of the emitted light for filtering the emitted light; and means for visually recording a plasma profile.

The apparatus can comprise display means for displaying the numerical value of the plasma dimension as a function of time during the laser welding process. The plasma dimension is typically displayed as a temporal trace.

DRAWINGS

These and other features, aspects and advantages of the present invention will become better understood from the following description, appended claims and accompanying drawings, where:

Figure 3:
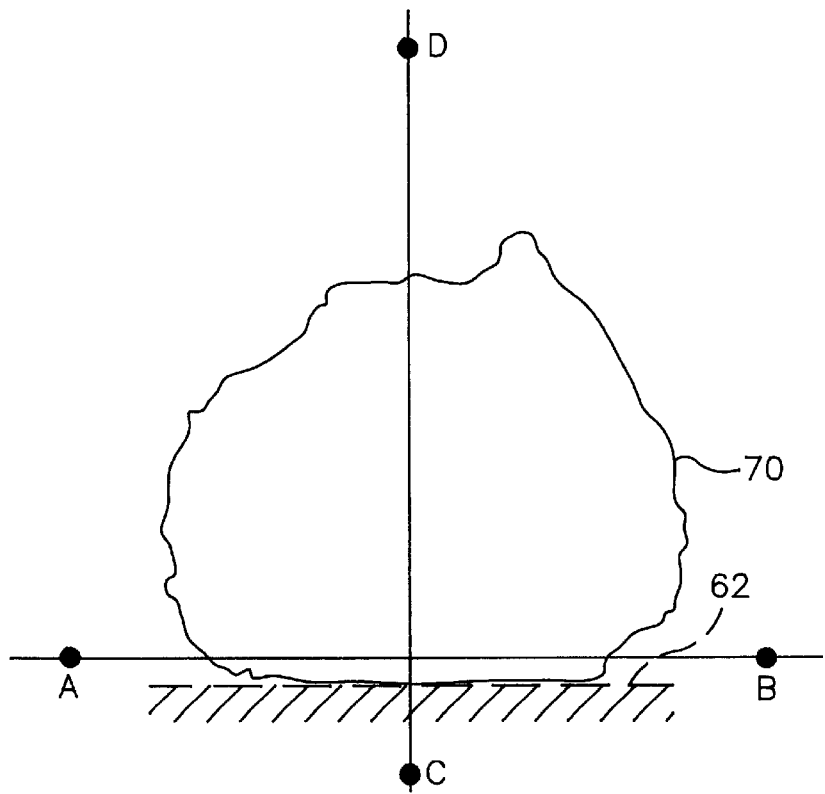
Figure 4:
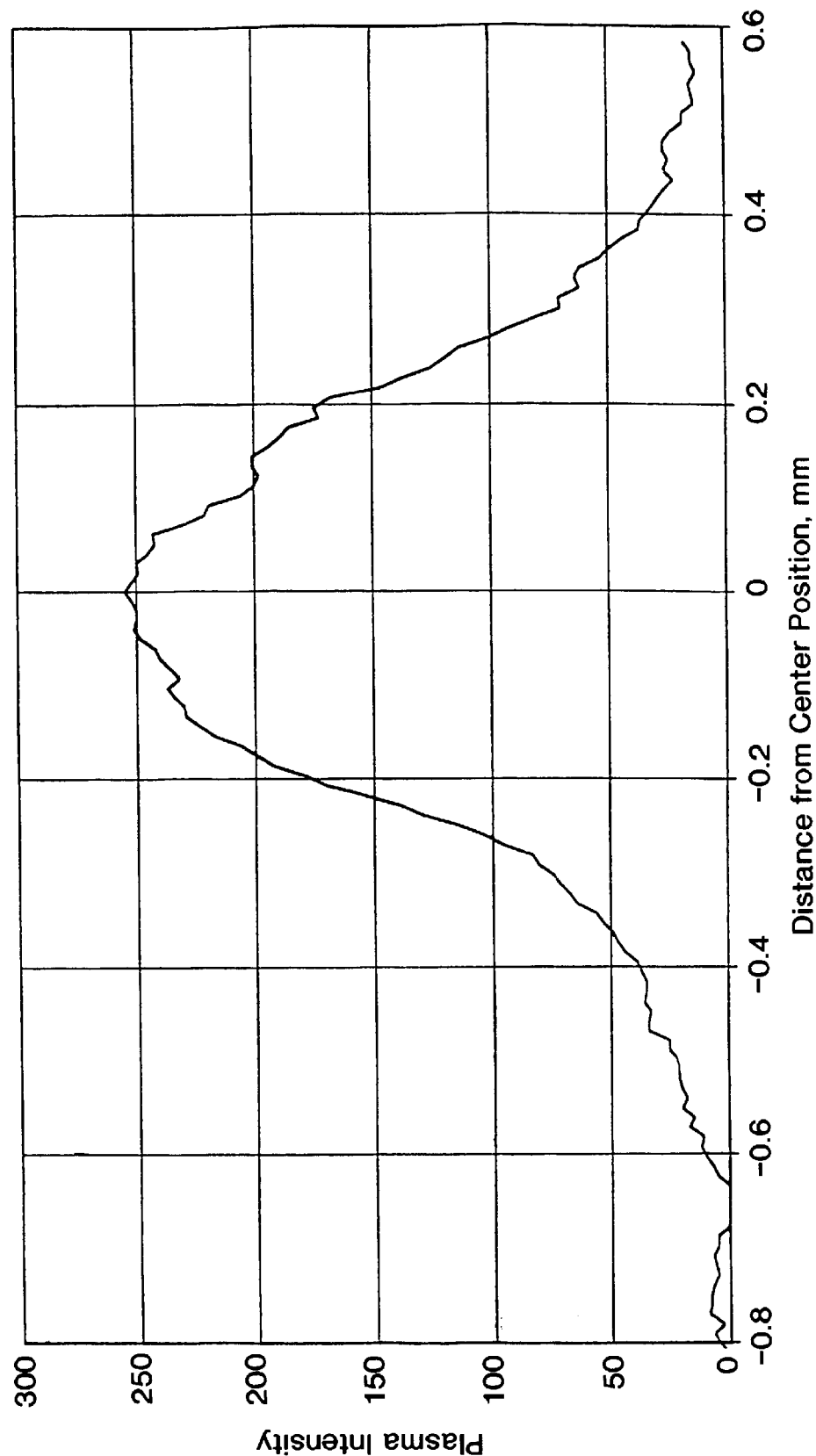
Figure 5:
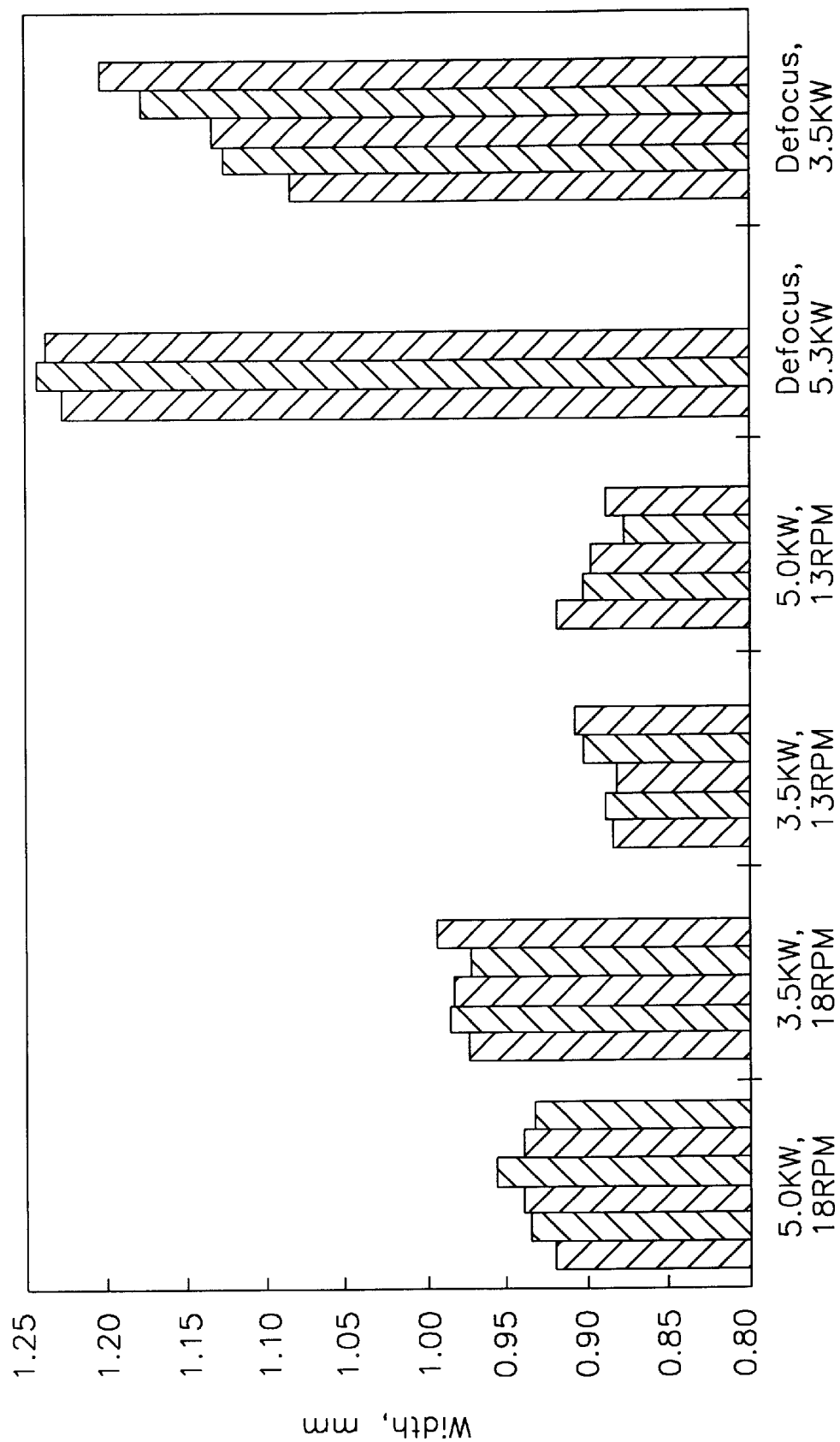
Figure 6:
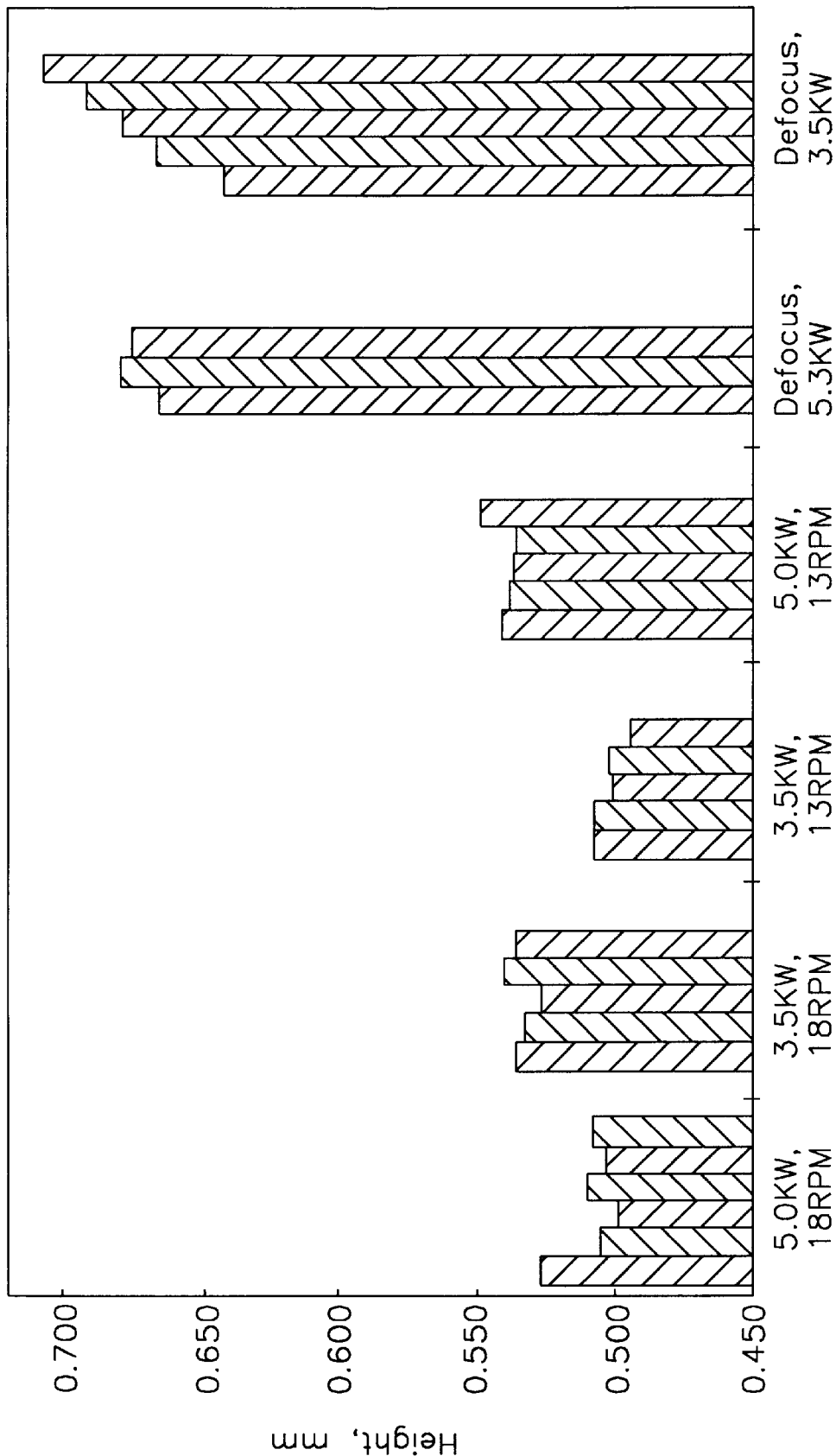

FIG. 3 schematically illustrates a plasma profile and horizontal and vertical lines A-B and C-D, respectively, the plasma intensity along which were used to determine the plasma width and plasma height, respectively;

FIG. 4 illustrates a typical plasma horizontal profile without saturation of the digitizing equipment;

FIG. 5 summarizes the response of the time-averaged plasma width to various welding conditions; and FIG. 6 summarizes the response of the time-averaged plasma height to various welding conditions.

Figure 7:
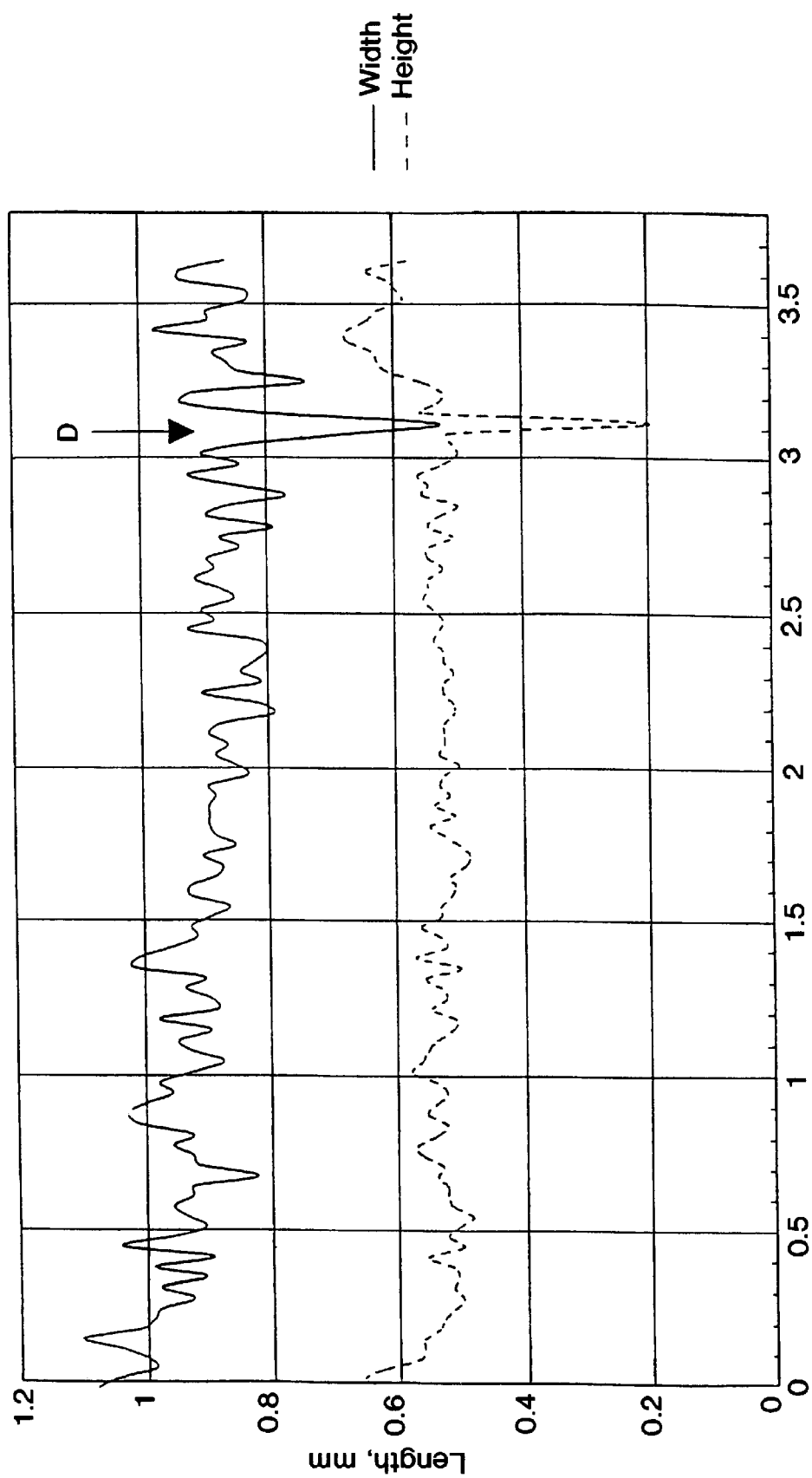
Figure 8:
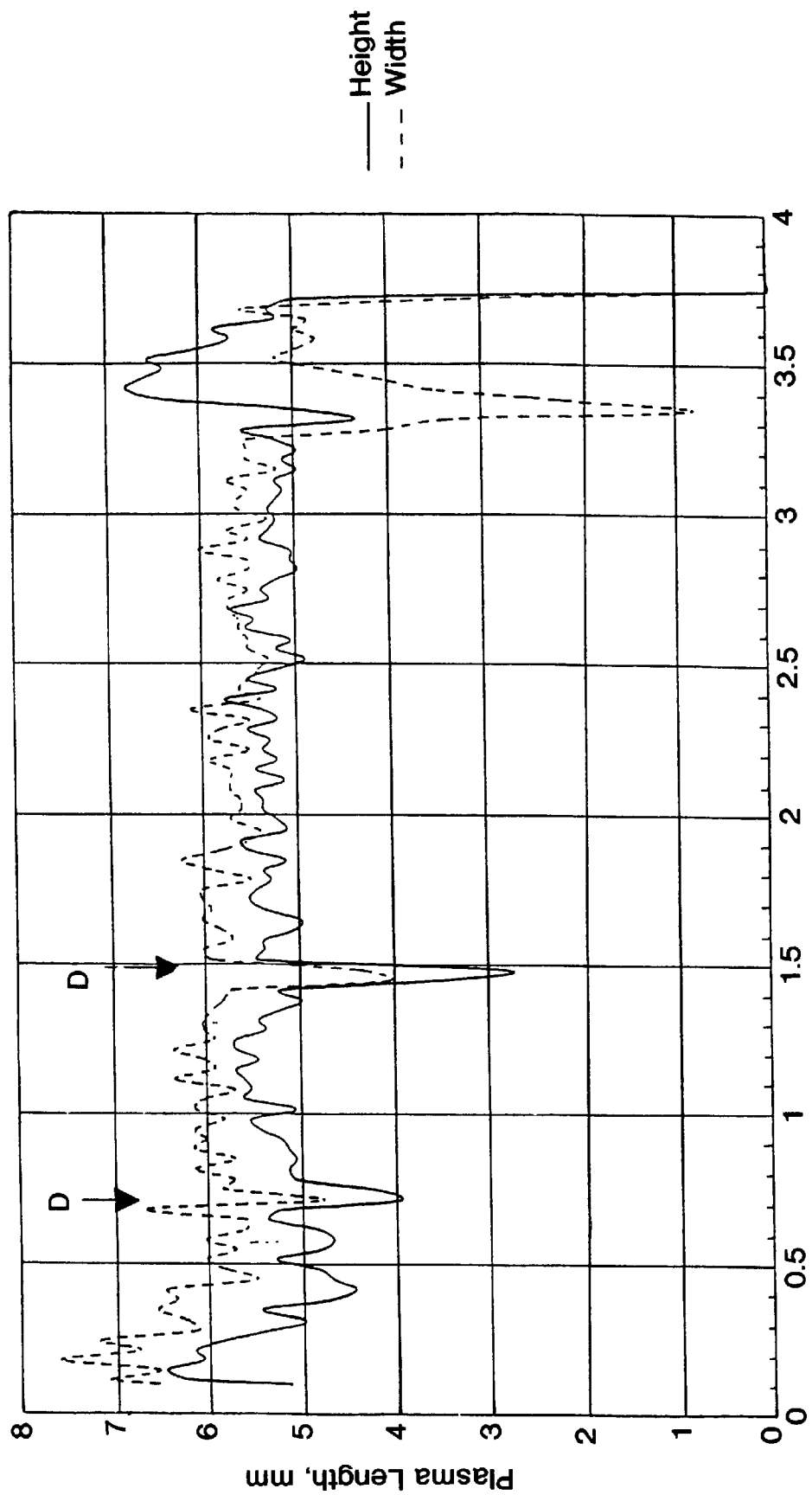
Figure 9:
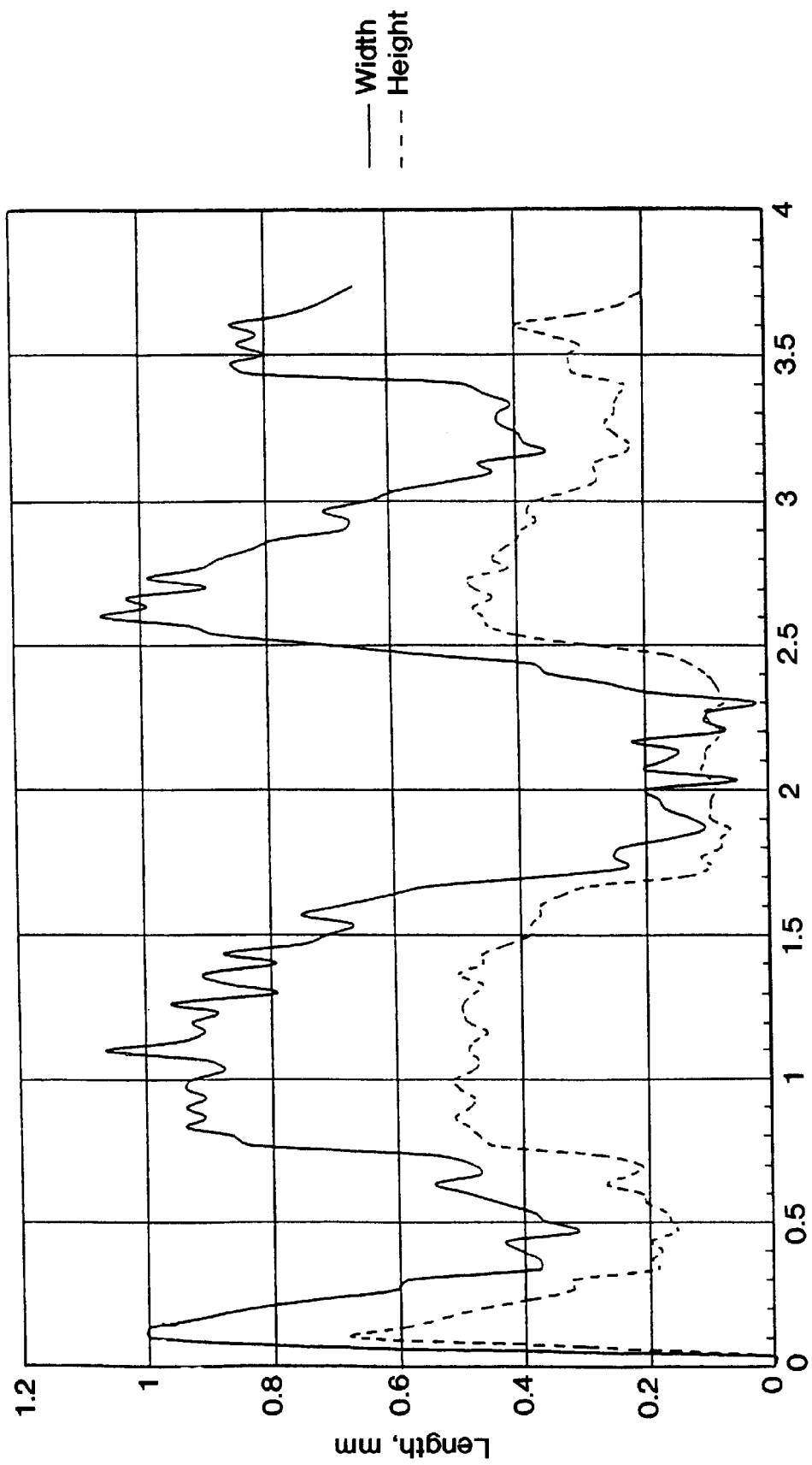
Figure 10:
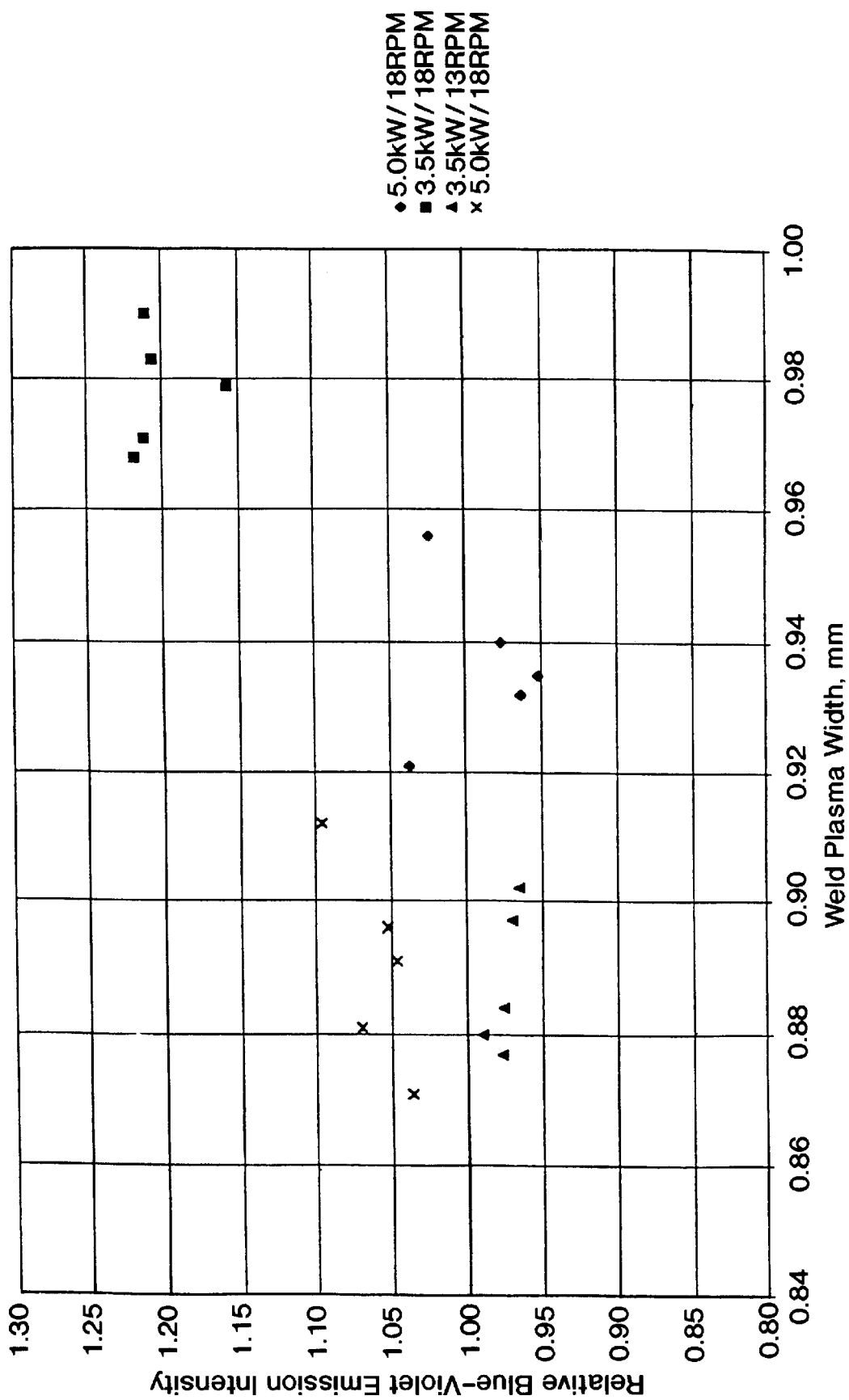

FIG. 7 illustrates temporal traces of the plasma width and plasma height, showing a dip at about 3.2 seconds in both traces (Test 347);

FIG. 8 illustrates temporal traces of plasma width and plasma height, showing dips at about 0.7 and 1.5 seconds (Test 348);

FIG. 9 illustrates temporal traces of the plasma width and plasma height for a badly deformed workpiece at 5.3 kW, 18 RPM (Test 352); and FIG. 10 illustrates the correlation between blue-violet emission intensity and plasma width for various laser power and workpiece rotational speed conditions.

DESCRIPTION

Weld monitoring tests were conducted on workpieces using welding conditions similar to those typically used in actual production of the workpiece. The primary test matrix included multiple tests at different laser power and workpiece rotational speed. Tests were also conducted with the laser defocused; with no shield gas flow; with contaminants placed between the welded surfaces; and with mechanically deformed workpieces, to observe changes in the physical dimensions of the plasma.

Welding Assembly

Figure 1:
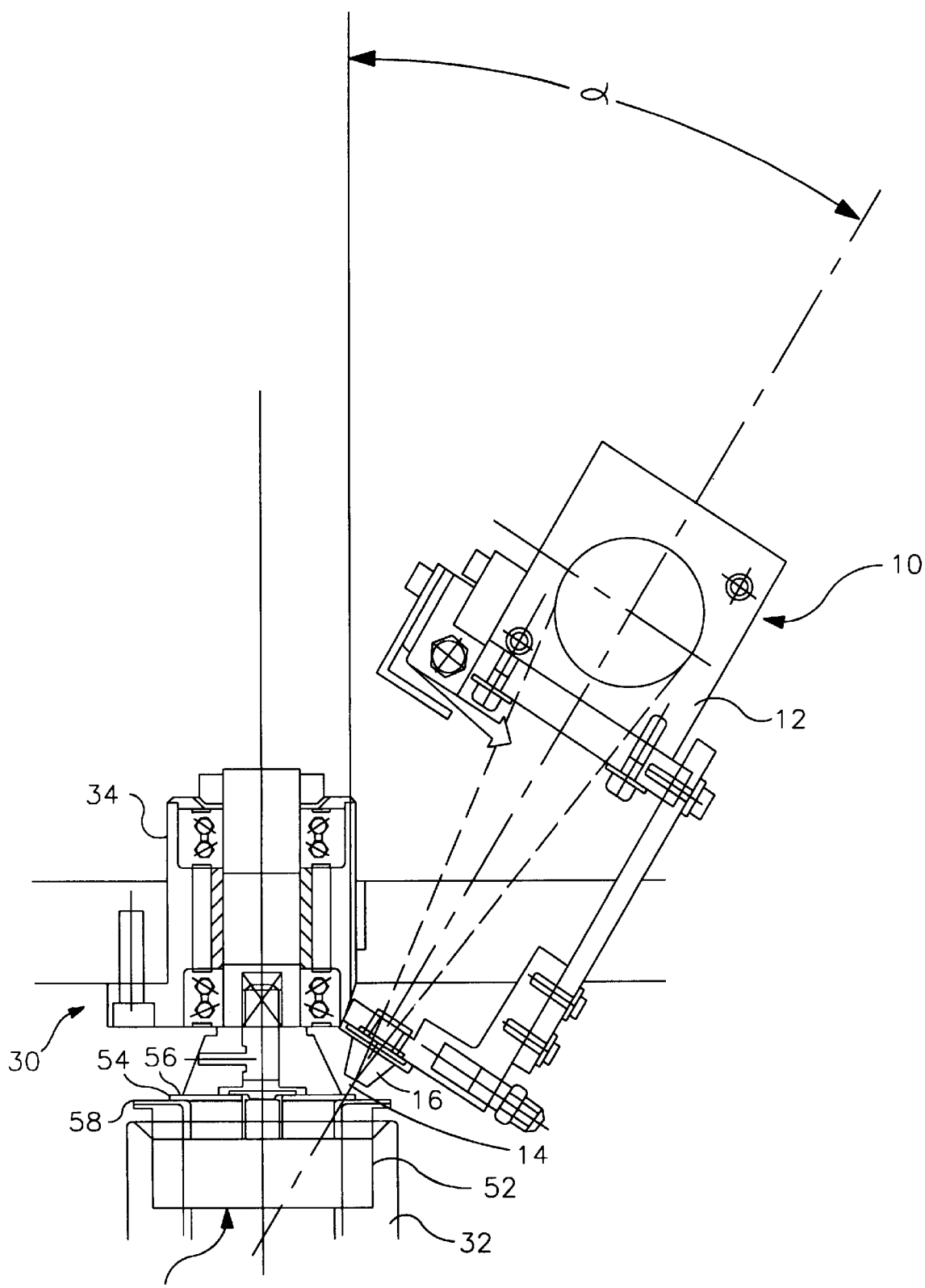
FIG. 1 is a schematic diagram of a laser welding assembly as used in tests conducted in accordance with the present invention.

FIG. 1 illustrates a laser welding assembly, including a laser beam delivery system 10 and a welding fixture 30 for fixturing a workpiece 50, as used in the tests. The laser beam delivery system 10 comprises a laser 12 for generating a laser beam 14 and focusing optics 16 for focusing the laser beam. The laser is a continuous output, carbon dioxide ($CO_2$) laser. The focusing optics 16 includes a 20-cm focal length lens. The welding fixture 30 comprises a base 32 and a clamping portion 34 which is movable relative to the base. The workpiece 50 was a vehicle air bag inflator cannister, including a base 52 and a cover 54 which is welded to the base 52. During the welding operation, the base 52 of the workpiece 50 was received in the base 32 of the welding fixture 30 and the cover 54 was fixed on the base 52 by the clamping portion 34. The laser beam 14 impinged on the top surface 56 of the cover 54 as the workpiece 50 was rotated, forming a circular penetration weld between the cover 54 and the rim 58 of the base 52.

The workpiece 50 was rotated at a speed of about 13 RPM in some of the tests and at about 18 RPM in other tests. The laser 12 was focused onto the workpiece 50 at an angle $\alpha$ of about 25° relative to the normal to the top surface 56 of the cover 54. The laser beam 14 spot size on the top surface 56 was about 0.5 mm under nominal operating conditions. A colinear flow of helium shield gas suppressed the weld plasma.

The workpieces were constructed of 301 stainless steel, comprising approximately by weight: Fe (69–74%), Cr (16–18%), Ni (6–8%), Mn (2%), Si (1%) and C (0.1% max).

Plasma Size Monitoring

Figure 2:
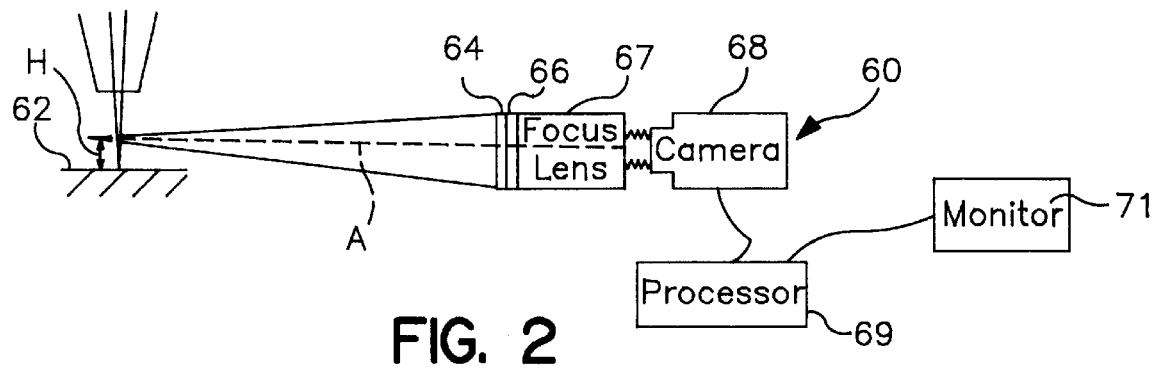
FIG. 2 is a schematic illustration of the experimental setup used for monitoring the plasma physical dimensions in accordance with the present invention.

The physical dimensions of the weld plasma were monitored during the welding process using the experimental setup 60 shown in FIG. 2. The light emitted from the plasma (typically at a height H) above the weld surface 62 (the top surface 56 of the workpiece 50) was passed through a neutral density filter 64, a blue-violet glass light filter 66 (type BG-12 having an optical transmission band of about 335 nm to about 480 nm) and a zooming lens 67, and recorded by a video camera 68 (Panasonic CCD camera) optically coupled to the filters 64, 66 and the zooming lens 67. The video camera 68 recorded at a framing rate of 30 frames per second. The video camera 68 was substantially in optical alignment with the filters 64, 66. A microprocessor 69 and an associated monitor 71 were electrically connected to the video camera 68 for performing numerical calculations and displaying test results. The plasma emission was collected horizontally, substantially parallel to the weld surface 62. The blue-violet light filter 66 was selected to transmit the light wavelength range that covered the major emission lines for the stainless steel workpiece. The neutral density filters 64 reduced the emitted light intensity and resolved the physical structure of the plasma "core" emission.

Referring to FIG. 3, the spatial distribution 70 of the filtered light from the plasma was visually recorded on video frames. Numerical values representative of the plasma dimensions were assigned by digitizing the video frame (frame by frame) along the direction of line A-B to obtain a value representative of the plasma horizontal profile, and along the direction of line C-D, oriented approximately perpendicular to line A-B, to obtain a value representative of the plasma vertical profile. Line A-B was positioned about 0.07 mm above the weld surface 62, and line C-D passed through approximately the center of the plasma profile. The horizontal plasma profile was also determined at about 0.16 mm above the surface. Numerical values of the width and height of the plasma were determined using only those readings having a digitized intensity exceeding 25 counts. The maximum count in the digitizing system was 525. In some cases, the digitized plasma intensity count along a portion of the line A-B and/or the line C-D was saturated (above 525 counts) and the intensity for those readings was equated to 525 counts. The plasma dimensions were determined using a digitized plasma intensity of 25 counts as the threshold irrespective of intensity saturation.

FIG. 4 shows a plasma horizontal profile without digitized plasma intensity saturation (Test 359).

The test data reported in TABLE 3, described in greater detail below, were averaged for video frames taken between 0.5 and 2.7 seconds after the start of the welding process. The frames for the portion of the welding process before about 0.5 seconds (welding start-up region), and the portion of the welding process after about 2.7 seconds (weld overlap region) were not used in calculating the data reported in TABLE 3. The microprocessor 69 was used in the calculations.

The plasma width as determined at 0.07 mm above the weld surface (along line A-B) correlated well with the weld quality, but the plasma width as determined at 0.16 mm above the weld surface did not. Accordingly, the plasma profile is preferably monitored at a height of less than about 0.1 mm above the weld surface to produce best results.

The data suggests that best results are obtained when the video camera images the plasma in the horizontal direction. Particularly, the filters 64, 66 and the video camera 68 are preferably positioned relative to the weld surface 62 such that the optical axis of the camera focusing lens (FIG. 2) is oriented substantially parallel to the weld surface 62. A small angle of less than about 5° is preferred, and an angle of about 0° produced excellent results. Monitoring at a small angle is advantageous because, as described in greater detail below, the weld quality generally correlates more closely with the plasma width than the plasma height and the small angle provides excellent monitoring of the plasma width.

A linear array detector (not shown) can optionally be used instead of the video camera 68 to determine the plasma size. The linear array detector can also focus and zoom onto the plasma close to the weld surface and in a substantially horizontal direction relative to the weld surface. A conventional microprocessor (not shown) can be electrically connected to the linear array detector to determine the plasma width from the data generated from the linear array detector. The linear array detector eliminates the step of digitizing from a whole video frame to determine the plasma dimensions, thus providing a substantially instantaneous response sufficient for process control of the welding process.

Test Conditions

TABLE 1 below lists the test conditions.

TABLE 1

TEST CONDITIONS

| TEST NO. | LASER POWER (kW) | WORKPIECE ROTATIONAL SPEED (RPM) | COMMENTS |
|---|---|---|---|
| 314–317 | 5.3 | 18 | Nominal laser power/nominal rotational speed. |
| 318, 319 | 3.5 | 18 | Low laser power/nominal rotational speed. |
| 320–324 | 3.5 | 13 | Low laser power/low rotational speed. |
| 325–330 | 5.3 | 13 | Nominal laser power/low rotational speed. |
| 332 | 5.3 | 18 | Nominal laser power/nominal rotational speed. |
| 333 | 5.3 | 18 | No shield gas flow. Bad weld. |
| 334 | 5.3 | 18 | With shield gas flow. No data collected. |
| 335 | 5.3 | 18 | With shield gas flow. |
| 336–340 | 5.3 | 18 | +2 mm (up) laser beam defocusing. |
| 341–345 | 3.5 | 18 | +2 mm (up) laser beam defocusing. |
| 346 | 5.3 | 18 | Hydraulic fluid at four locations between weld surfaces. |
| 347 | 5.3 | 18 | Motor oil at four locations between weld surfaces. |
| 348 | 5.3 | 18 | Bar grease at four locations between weld surfaces. |
| 352 | 5.3 | 18 | Badly bent workpiece cover. |
| 353 | 5.3 | 18 | Slightly bent workpiece cover. |
| 354–359 | 5.0 | 18 | Nominal laser power/nominal rotational speed. |
| 360–364 | 3.5 | 18 | Low laser power/nominal rotational speed. |
| 365–369 | 3.5 | 13 | Low laser power/low rotational speed. |
| 370–374 | 5.0 | 13 | Nominal laser power/low rotational speed. |

The primary test matrix included multiple tests at 5.0–5.3 kW laser power (referred to herein as "nominal laser power") and a low workpiece rotational speed of about 13 RPM (Tests 325–330, 370–374); nominal laser power and workpiece rotational speed of about 18 RPM (referred to herein as the "nominal workpiece rotational speed") (Tests 314–317, 332, 335, 354–357 and 359); at low laser power of about 3.5 kW and low workpiece rotational speed (Tests 320–324, 365–369); and at low laser power and nominal workpiece rotational speed (Tests 318, 319, 360–364). Tests were also conducted with the laser beam defocused (Tests 336–345); with no shield gas flow (Test 333); with various fluid contaminants (hydraulic fluid, motor oil and grease) placed between the workpiece weld surfaces (Tests 346–348); and with bent workpieces (Tests 352 and 353).

Effect of Test Conditions on Weld Quality and Plasma Size Laser Power and Workpiece Rotational Speed/Weld Quality Weld quality was determined by sectioning welded workpieces and visually examining the weld structure at the sections. The weld quality was determined based on the depth of the weld penetration from the top surface 56 of the workpiece 50, the welded area, and the presence of weld defects, including surface depressions, voids and cracks.

Workpieces welded in Tests 316, 320, 325, 355, 357, 362, 367, 370 and 372 were sectioned and visually inspected.

Referring to FIG. 1, welds having a depth of penetration equal to at least the total thickness of the workpiece cover 54 and the rim 58 of the base 52 of the workpiece 50 were considered satisfactory. TABLE 2 below summarizes the visual inspection results.

TABLE 2

VISUAL INSPECTION RESULTS

| TEST NO. | PROCESS PARAMETERS | COMMENTS |
|---|---|---|
| 316, 355, 357, 362 | 5.3 kW/18 RPM | Nominal laser power/nominal speed. Good weld. |
| 320, 367 | 3.5 kW/13 RPM | Low laser power/low speed. Good weld. |
| 325, 370, 372 | 5.3 kW/13 RPM | Nominal laser power/low speed. Good weld. |
| 333 | 5.3 kW/18 RPM. No shield gas flow. | Bad weld with insufficient penetration depth. |
| 336 | 5.3 kW/18 RPM. +2 mm (up) defocus. | Bad weld with insufficient penetration depth. |
| 342 | 3.5 kW/18 RPM. +2 mm (up) defocus. | Bad weld having approximately 60% unwelded area. |
| 343 | 3.5 kW/18 RPM. +2 mm (up) defocus. | Bad weld having essentially no strength. |
| 344 | 3.5 kW/18 RPM. +2 mm (up) defocus. | Bad weld having approximately 60% unwelded area. |
| 345 | 3.5 kW/18 RPM. +2 mm (up) defocus. | Bad weld having approximately 75% unwelded area. |
| 347 | 5.3 kW/18 RPM. Motor oil contaminated surface at four locations. | Sectioning was not performed at containinated locations. |
| 348 | 5.3 kW/18 RPM. Bar grease contaminated | Insufficient weld penetration at one of the eight examined locations, surface depression at two of the eight locations. |
| 352 | 5.3 kW/18 RPM. Badly bent cover. | Bad weld having insufficient penetration depth, wide vertical crack and surface depression. |
| 353 | 5.3 kW/18 RPM. Slightly bent cover. | Good weld. |

At 5.0–5.3 kW laser power, welds of acceptable quality (good welds) were consistently produced at both 13 RPM and 18 RPM workpiece rotational speeds. At 3.5 kW laser power, however, good welds were produced at 13 RPM rotational speed, but welds of unacceptable quality (bad welds) of insufficient depth of penetration and other defects were produced at 18 RPM rotational speed.

Thus, good welds were formed when the "laser specific energy," defined herein as the ratio of laser power per unit weld surface area to workpiece rotational speed, was sufficiently high.

TABLE 3 below presents the time-averaged plasma width and plasma height determined at the different laser power and workpiece rotational speed conditions.

TABLE 3

PLASMA WIDTH AND HEIGHT

| TEST NO. | LASER POWER (kW) | WORK-PIECE SPEED (RPM) | OTHER CONDITIONS | PLASMA WIDTH (mm) | PLASMA HEIGHT (mm) |
|---|---|---|---|---|---|
| 354–359 | 5.0 | 18 | Mean | 0.937 | 0.508 |
| | | | Standard Deviation ($\sigma$) | 0.011 | 0.010 |
| 360–364 | 3.5 | 18 | Mean | 0.981 | 0.534 |
| | | | Standard Deviation ($\sigma$) | 0.007 | 0.005 |
| 365–369 | 3.5 | 13 | Mean | 0.888 | 0.502 |
| | | | Standard Deviation ($\sigma$) | 0.011 | 0.005 |
| 370–374 | 5.0 | 13 | Mean | 0.890 | 0.540 |
| | | | Standard Deviation ($\sigma$) | 0.016 | 0.005 |
| 338–340 | 5.3 | 18 | Laser Defocused | | |
| | | | Mean | 1.236 | 0.674 |
| | | | Standard Deviation ($\sigma$) | 0.007 | 0.007 |
| 341–345 | 3.5 | 18 | Laser Defocused | | |
| | | | Mean | 1.130 | 0.679 |
| | | | Standard Deviation ($\sigma$) | 0.045 | 0.025 |
| 346 | 5.3 | 18 | Hydraulic fluid contamination | 0.898 | 0.524 |
| 347 | 5.3 | 18 | Motor oil contamination | 0.899 | 0.528 |
| 348 | 5.3 | 18 | Bar grease contamination | 0.880 | 0.523 |
| 352 | 5.3 | 18 | Badly bent workpiece cover | 0.601 | 0.306 |
| 353 | 5.3 | 18 | Slightly bent work piece cover | 0.931 | 0.526 |

The plasma width increased from a mean value of 0.937 mm ($\sigma=0.011$ mm) to 0.981 mm ($\sigma=0.007$ mm) as the laser power was decreased from 5.0 kW (good welds) to 3.5 kW (bad welds) at 18 RPM. At 13 RPM, the mean plasma width was 0.888 mm ($\sigma=0.011$) at 3.5 kW and 0.890 mm ($\sigma=0.016$ mm) at 5.0 kW (good welds). According to the test results, a plasma width from about 0.87 mm to about 0.95 mm correlated with good welds. A plasma width bounded by about −2 to −3 and +2 to +3 standard deviations of the mean plasma width determined under nominal weld conditions can be correlated with good welds according to the test results. The weld plasma size (plasma width or plasma height) as determined under nominal laser power and workpiece rotational speed conditions, and with proper shield gas flow, sufficient cleanliness at the weld zone of the workpiece, lack of severe physical deformation of the workpiece, and proper focusing of the laser beam onto the workpiece, was used as a "predetermined value" that is representative of welds of acceptable quality, and was compared to numerical values of the weld plasma size assigned for changed laser welding operating conditions and changed workpiece conditions, as described herein.

The test results indicate that the plasma height is a less good overall indicator of weld quality than the plasma width. At 18 RPM, the mean plasma height was 0.508 mm at 5.0 kW (good welds) and 0.534 mm at 3.5 kW (bad welds). At 13 RPM, the mean plasma height was 0.540 mm at 5.0 kW and 0.502 mm at 3.5 kW (both good welds). These data show no significant difference between the plasma height for good welds and bad welds.

The response of the plasma width and the plasma height to changes in laser power and workpiece rotational speed are summarized in FIGS. 5 and 6, respectively. The plasma width and plasma height increased with decreased laser power at the nominal workpiece rotational speed of 18 RPM.

At 13 RPM, the plasma was smaller and more stable than at 18 RPM. The plasma width at 3.5 kW and 13 RPM and at 5.0 kW and 13 RPM, however, were about the same as that at 5.0–5.3 kW and 18 RPM.

It will be understood by those skilled in the art, that the plasma width and/or plasma height can also be monitored to determine weld quality for welding processes in which the workpiece is not rotated relative to the laser beam. For example, the present invention can be used to monitor welding processes in which a laser beam is translated at some desired speed relative to the workpiece to form linear welds.

Laser Defocusing/Plasma Size

Tests 336–345 were conducted at a rotational speed of 18 RPM with the focused laser spot moved up (+) 2 mm from the nominal set point and out of focus (defocused). The resulting spot size changed to about 0.8 mm. Sectioning and visual analysis of the workpiece from Test 336 (nominal laser power) indicated a poor weld with insufficient depth of penetration. Sectioned samples from Tests 342–345 (low laser power) contained large unwelded areas of >60%. In Test No. 344, the weld had essentially no strength and the cover was easily removed from the base.

Referring to TABLE 3, the mean plasma width and plasma height when the $CO_2$ laser is out of focus (at 5.3 kw and 18 RPM) were respectively 1.236 mm and 0.674 mm (Tests 338–340), about 32% and about 33% above their respective nominal values (Tests 354–359). At 3.5 kW and 18 RPM (Tests 341–345), the mean plasma width and plasma height were respectively 1.130 mm and 0.679 mm, about 21% and about 34% above their respective nominal values.

The video camera record also showed more molten liquid spills from the weld plasma, consistent with the visual observation of multiple solidified liquid metal spots on the workpieces under defocused laser conditions.

The test results are summarized in FIGS. 5 and 6. With the laser defocused, the plasma width and plasma height both increased significantly at both nominal and low laser power. Thus, both the plasma width and plasma height can be monitored to detect laser defocusing problems.

Weld Contamination/Plasma Size

In Test 347, motor oil was placed between the opposed surfaces of the cover 54 and the rim 58 of the base 52 at four locations. A "dip" D was observed at about 3.2 seconds in the temporal trace of each of the plasma width and the plasma height (FIG. 7). Dips were determined in the temporal traces based on the time duration, and the magnitude of the change in the plasma width or plasma height over the time duration. At 18 RPM, a dip was considered a significant change in the plasma dimension over a time duration of at least about 30 ms at which the plasma dimension is reduced below 15% of that at the start of the dip. At 13 RPM, a time duration of at least about 40 ms was considered sufficient. Referring to FIG. 7, at about 3.2 seconds, the duration of the dip is about 700 ms during which the plasma width is less than 15% of 0.9 mm. The duration exceeds 30 ms. Thus, the dip is significant.

The time duration of the dip is considered an important indicator of the severity of the localized weld problem. The longer the duration of the dip, the greater is the corresponding portion of the weld that is affected. A sudden decrease in the weld dimension, such as caused by a momentary decrease in the laser beam power, that does not last for more than 30 ms, does not necessarily result in a bad weld. As the time duration of dips increases, the greater is the reduction in the burst pressure strength of the resulting weld. A low burst pressure strength is highly undesirable in workpieces that are expected to maintain a high internal pressure until a predetermined time of pressure release.

In Test 348, bar grease was placed at four locations between the opposed surfaces of the workpiece cover 54 and the rim 58 of the base 52. Referring to FIG. 8, dips D were observed at about 0.7 seconds and at about 1.5 seconds in the temporal trace of both the plasma width and the plasma height. It is believed that these dips correspond to local weld defects due to sudden changes or discontinuities in the workpiece material properties. Sectioning of the welded workpiece into four pieces revealed insufficient weld penetration at one of the eight examined locations, and a depressed weld surface at two of the eight locations.

Thus, the temporal traces of the plasma physical dimensions can be analyzed for the presence of dips representing the presence of contamination, and insufficient cleanliness, at the weld zone.

Shield Gas Flow/Plasma Size

Test 333 was conducted with no shield gas flowed to control the plasma. The resulting uncontrolled plasma produced a very large plasma dimension. Sectioning of the welded workpiece and visual inspection indicated a poor weld of insufficient depth of penetration. Based on this result, the plasma size can be monitored to effectively detect the absence of shield gas flow.

Workpiece Deformation/Plasma Size

Two tests were conducted with the workpiece covers physically deformed; namely, Test 352 with a severely bent cover, and Test 353 with a slightly bent cover. For Test 352, FIG. 9 shows broad dips in the temporal traces of the weld plasma size. The video camera record showed near extinction of the plasma at times during the welding process that corresponded to these broad dips.

In addition, as shown in TABLE 3, the average width and height of the plasma were 0.601 mm and 0.306 mm, about 36% below and about 40% below their respective nominal values. Sectioning of the welded workpiece into three pieces and visual inspection revealed insufficient depth of weld penetration, a wide vertical crack, weld surface depression, and a gap between the cover and the workpiece.

For Test 353 with a slightly bent cover, visual inspection indicated a good weld. The average width of the weld plasma was 0.931 mm, only about 0.6% below the nominal value. Based on this result, an acceptable quality weld can be formed when the workpiece is not too physically deformed. A slight surface defect can result in an acceptable weld.

Thus, monitoring the plasma size (plasma width or plasma height) can be effective in detecting physical deformation of the workpiece and, particularly, serious defects such as a badly deformed workpiece.

Plasma Size/Plasma Emission Intensity/Weld Quality

U.S. Patent application Ser. No. entitled "METHOD AND APPARATUS FOR MONITORING LASER WELD QUALITY VIA PLASMA LIGHT INTENSITY MEASUREMENTS," by the present co-inventors and filed concurrently with this application, discloses that in addition to monitoring the plasma size, weld quality can alternately be monitored in-process by determining the intensity of light emitted from the plasma. Thus, there is a correlation between light emission intensity and plasma size for weld plasma.

FIG. 10 shows a plot of the relative emission intensity in the blue-violet region for the weld plasma versus the plasma width for the different laser power and workpiece rotational speed conditions used in the present tests. As shown, emission intensity generally increases with plasma width. Also, the data points representing bad welds (3.5 kW/18 RPM) are all clustered in the upper right corner of the plot. (Poor welds resulting from extremely low laser power are expected to have very low emission intensity and plasma width, and associated data points in the lower left corner or beyond of the graph) (not shown).

A possible explanation for the correlation between light emission intensity and plasma width is that both of these characteristics of the plasma are influenced by the same mechanism. The plasma is sustained by the excitation caused by a high power $CO_2$ laser. At low laser power, the jet flow of vapor and molten liquid droplets induced by laser ablation is expected to be reduced. This in turn reduces the rate in cooling the plasma by the jet flow. The reduction in cooling plasma can result in increases in plasma grow thus higher plasma intensity. Similarly, if the weld surface is contaminated by liquids such as hydraulic fluid, oil or grease, the laser beam can induce a strong vapor jet via laser ablation. The strong gas flow in the jet can cool the plasma and results in diminishing and even extinguishing the plasma and forming a steep dip in the temporal trace of plasma size and plasma intensity.

Thus, the present method and apparatus can be used to effectively detect problems during laser welding processes that can result in problematic welds. The present invention can monitor overall weld quality by monitoring one or more time-averaged plasma physical dimensions, preferably the plasma width. The time-averaged dimensions can be determined for a selected portion of the welding process, preferably the most stable portion. Optionally, potential localized weld problems can be detected by monitoring temporal traces of one or more selected plasma physical dimensions, preferably the plasma width, for sudden changes in the plasma dimensions.

The present invention can be used to effectively distinguish between good and bad welds during laser welding processes and, accordingly, reduce the rate of type I and type II errors, and enable significant weld problems to be detected at the weld assembly.

The present invention can be used to monitor weld quality in-process during welding processes using other types of gas lasers, as well as solid state lasers. The lasers can have continuous or pulsed output.

The present invention can also be used to monitor welding processes that form curvilinear weld shapes other than circular welds, as well as linear welds. In addition, other weld joint configurations such as butt welds and fillet welds can be monitored.

The present invention can be used to monitor other laser materials processing applications such as metal cutting, drilling, powder metal sintering, surface alloying and heat treating processes.

Although the present invention is described in considerable detail with reference to certain preferred embodiments thereof, other embodiments are possible. Therefore, the scope of the appended claims is not limited to the description of the preferred embodiments contained herein.

What is claimed is:

1. A method of monitoring quality of a laser process in which a laser beam irradiates a workpiece and produces a plasma surrounding the workpiece, the method comprising the steps of:
    a) providing a predetermined value of at least one physical dimension of the plasma at the workpiece, the predetermined value being representative of an acceptable quality weld;
    b) passing the light emitted from the plasma through a light filter, the light filter having a transmission band covering the wavelengths associated with the major emission lines of the emitted light;
    c) passing the light emitted from the light filter through a focusing lens, the focusing lens being positioned such that an optical axis of the focusing lens is approximately parallel to the surface of the workpiece;
    d) measuring the spatial distribution of the intensity of light passing through the focusing lens as a function of time by using either a video camera or a linear array detector optically connected to the focusing lens;
    e) digitizing video frames taken by the video camera or linear array detector along a first direction to determine a numerical value representative of the plasma width, the first direction being substantially parallel to the surface of the object and less than about 0.5 mm above the surface of the object; and
    f) comparing the numerical value assigned in step (e) to the predetermined value, wherein the process quality is evaluated as acceptable quality if the numerical value assigned in step (e) is within a predetermined range of the predetermined value.

2. A method of monitoring weld quality of a laser welding process in which a laser beam impinges onto a surface of a workpiece and a plasma is produced above the surface of the workpiece, the method comprising the steps of:
    a) providing a predetermined value of at least one physical dimension of the plasma above the surface of the workpiece, the predetermined value being determined under laser welding process conditions that produce acceptable quality welds;
    b) monitoring the spatial distribution of the intensity of light emitted from the plasma during the welding process, the light being monitored along an optical axis substantially parallel to the surface of the workpiece and at a height less than 0.5 mm above the surface of the workpiece as a function of time;
    c) assigning a value of the physical dimension of the plasma based on the intensity of light monitored in step (b) as a function of time during the laser welding process; and
    d) comparing the value of the physical dimension of the plasma assigned in step (c) to the predetermined value, wherein the weld formed during the laser welded process is evaluated as acceptable quality for values of the physical dimension of the plasma assigned in step (c) within a predetermined range of the predetermined value of the physical dimension.

3. The method of claim 2, wherein the predetermined value of the physical dimension is a time-averaged value, and the step of assigning comprises assigning the value of the physical dimension of the plasma from the intensity of the light monitored over substantially only a steady state region of the laser welding process.

4. The method of claim 3, wherein the physical dimension is at least one of the plasma width and the plasma height.

5. The method of claim 4, further comprising the step of correlating the time-averaged value of the physical dimension of the plasma with (i) the speed of movement of the laser beam relative to the workpiece, and (ii) the power of the laser beam.

6. The method of claim 4, further comprising the step of correlating the time-averaged value of the physical dimension of the weld with the depth of penetration of the weld.

7. The method of claim 4, further comprising the step of correlating the time-averaged value of the physical dimension of the plasma with at least one of (i) the focusing of the laser beam onto the workpiece; (ii) the flow of a shield gas about the plasma; and (iii) physical deformation of the workpiece.

8. The method of claim 2, wherein the preselected range is within from about +3 to about −3 standard deviations of the predetermined value of the physical dimension.

9. The method of claim 2, wherein the workpiece is a vehicle air bag inflator canister.

10. The method of claim 2, wherein the step of monitoring the spatial distribution further comprises the steps of:
   i) passing the light emitted from the plasma through a light filter, the light filter having a transmission band covering the wavelengths associated with the major emission lines of the emitted light;
   ii) passing the light from the light filter through a focusing lens, the focusing lens being positioned such that an optical axis of the focusing lens is (1) approximately parallel to the surface of the workpiece, and (2) at a height less than about 0.5 mm above the surface; and
   iii) visually recording the emitted light transmitted through the light filter and the focusing lens.

11. The method of claim 10, wherein the workpiece is formed of a stainless steel material and the light filter has a transmission band of from about 335 nm to about 480 nm.

12. The method of claim 10, wherein the light passed through the focusing lens is converted to electric signals and visually recorded by a video camera or a linear array detector optically coupled to the focusing lens, and the step of assigning a value further comprises the steps of:
   i) digitizing video frames taken by the video camera or linear array detector along a first direction to determine a first numerical value representative of the plasma width, the first direction is (1) substantially parallel to the surface of the object, and (2) less than about 0.5 mm above the surface; and
   ii) digitizing video frames taken by the video camera or linear array detector along a second direction approximately perpendicular to the first direction to determine a second numerical value representative of the plasma height.

13. A method of monitoring a laser welding process in which a laser beam impinges onto a surface of a workpiece to form a weld and a plasma is produced surrounding the surface of the workpiece, the method comprising the steps of:
   a) monitoring the intensity of light emitted from the plasma along an optical axis substantially parallel to the surface of the workpiece and at a height less than 0.5 mm above the surface as a function of time during the laser process;
   b) assigning a numerical value representative of at least one physical dimension of the plasma to the monitored intensity of light, the numerical value being assigned as a function of time during the laser process; and
   c) evaluating the numerical value for dips representing changes in the numerical value of a predetermined magnitude and ration as a function of time during the laser welding process, wherein the dips representing welds of unacceptable quality.

14. The method of claim 13 wherein the step of monitoring the intensity of light further comprises the steps of:
   i) passing the light emitted from the plasma through a light filter, the light filter having a wavelength transmission band covering the wavelengths associated with the major emission lines of the emitted light;
   ii) passing the light from the light filter through a focusing lens, the focusing lens being positioned such that an optical axis of the focusing lens is (1) oriented substantially parallel to the surface of the workpiece, and (2) at a height less than about 0.5 mm above the surface; and
   iii) visually recording the light transmitted through the light filter and the focusing lens.

15. The method of claim 14, wherein the workpiece is formed of stainless steel and the light filter has a wavelength transmission band of from about 335 nm to about 480 nm.

16. The method of claim 14, wherein the emitted light passed through the light filter is visually recorded by a video camera or a linear array detector optically coupled to the light filter, and the step of assigning comprises the steps of:
   i) digitizing the video frames along a first direction to determine a first numerical value representative of the plasma width, the first direction is (1) substantially parallel to the surface of the workpiece, (2) less than about 0.5 mm above the surface; and
   ii) digitizing the video frames along a second direction approximately perpendicular to the first direction to determine a second numerical value representative of the plasma height.

17. The method of claim 13, wherein the step of evaluating comprises the steps of:
   i) producing a graph of the numerical value of the physical dimension of the plasma as a function of time during the laser welding process; and
   ii) inspecting the graph for the presence of dips in the numerical value.

18. The method of claim 13, wherein the physical dimension is at least one of the plasma width and the plasma height.

19. The method of claim 18, further comprising the step of correlating the numerical value of the physical dimension of the plasma with at least one of (i) contamination at the weld; (ii) the flow of a shield gas about the plasma; and (iii) physical deformation of the workpiece.

20. The method of claim 13, wherein the workpiece is a vehicle air bag inflator canister.

21. An apparatus for monitoring a laser welding process in which a laser beam impinges onto a surface of a workpiece to form a weld and a plasma is produced surrounding the surface, the apparatus comprising:
   a) means for monitoring the intensity of light emitted from the plasma along an optical axis substantially parallel to the surface of the workpiece and at a height less than 0.5 mm above the surface as a function of time during the laser welding process;
   b) means for determining from the monitored intensity of light a numerical value representative of at least one physical dimension of the plasma, the numerical value being determined as a function of time during the laser welding process; and c) means for calculating a time-averaged value of the numerical value for at least a portion of the laser welding process.

22. The apparatus of claim 21, wherein the physical dimension is the plasma width or the plasma height.

23. The apparatus of claim 21, wherein the monitoring means further comprises:

i) light filtering means passing the light emitted from the plasma and having a wavelength transmission band covering the major emission lines of the emitted light for filtering the emitted light;

ii) focusing lens means passing the light from the light filtering means and positionable relative to the surface of the workpiece such that the optical axis of the focusing lens means is (1) positioned substantially parallel to the surface, and (2) oriented at a height less than about 0.5 mm above the surface; and iii) recording means for visually recording the light transmitted through the light filtering means and the focusing lens means.

24. The apparatus of claim 23, wherein the object is formed of stainless steel and the light filter means comprises a light filter having a wavelength transmission band of from about 335 nm to about 480 nm.

25. The apparatus of claim 23, wherein the recording means comprises a video camera or a linear array detector optically coupled to the light filtering means for recording the plasma on video frames, and the determining means comprises:

i) means for digitizing the video frames along a first direction to determine a first numerical value representative of the plasma width, the first direction is (1) substantially parallel to the surface of the workpiece, and (2) less than about 0.5 mm above the surface; and ii) means for digitizing the video frames along a second direction approximately perpendicular to the first direction to determine a second numerical value representative of the plasma height.

26. An apparatus for monitoring a laser welding process in which a laser beam is directed onto a surface of a workpiece to form a weld and a plasma is produced above the surface, the apparatus comprising:

a) means for monitoring the intensity of light emitted from the plasma along an optical axis substantially parallel to the surface of the workpiece and at a height less than 0.5 mm above the surface as a function of time during the laser welding process;

b) means for determining a numerical value representative of at least one of the plasma width and the plasma height from the monitored intensity of light as a function of time during the laser welding process; and c) display means for displaying the numerical value as a function of time during the laser welding process.

27. The apparatus of claim 26, wherein the monitoring means further comprises:

i) light filtering means passing the light emitted from the plasma and having a wavelength transmission band covering the major emission lines of the emitted light for filtering the emitted light;

ii) focusing lens means passing the light from the light filtering means and positionable relative to the surface of the workpiece such that the optical axis of the focusing lens means is (1) positioned substantially parallel to the surface, and (2) oriented at a height less than about 0.5 mm above the surface; and iii) recording means for visually recording the light transmitted through the light filtering means and the focusing lens means.

28. The apparatus of claim 27, wherein the workpiece is formed of stainless steel and the light filtering means comprises a light filter having a wavelength transmission band of from about 335 nm to about 480 nm.

29. The apparatus of claim 27, wherein the recording means comprises a video camera or a linear array detector optically coupled to the light filtering means for visually recording the plasma on video frames, and the determining means comprises:

i) means for digitizing the video frames along a first direction to determine a first numerical value representative of the plasma width, the first direction is (1) substantially parallel to the surface of the workpiece, and (2) spaced less than about 0.5 mm above the surface; and ii) means for digitizing the video frame along a second direction approximately perpendicular to the first direction to determine a second numerical value representative of the plasma height.

30. The apparatus of claim 29, further comprising display means for producing a graph of at least one of the first and second numerical values versus time during the laser welding process.

* * * * *